United States Patent [19]

Dombrowski et al.

[11] Patent Number: 4,993,896
[45] Date of Patent: Feb. 19, 1991

[54] EDGE CONTOURING SYSTEM

[75] Inventors: David M. Dombrowski; William D. Rouse, both of Milford, Ohio; Robert W. Bean, Worster; Paul D. Cotnoir, North Grosvenordale, Conn.; David P. Asmus, Princeton; Andre G. Beaupre, Worster, both of Mass.; Kevin M. Conlon, Dracut, Mass.

[73] Assignee: General Electric Company, Cincinnati, Ohio

[21] Appl. No.: 284,011

[22] Filed: Dec. 13, 1988

[51] Int. Cl.[5] .............................. B23C 3/12
[52] U.S. Cl. ............................. 409/138; 144/134 C
[58] Field of Search ............. 409/138, 180, 184, 178, 409/182; 901/10, 41, 42; 51/165 TP, DIG. 14; 144/134 C, 134 D

[56] References Cited

U.S. PATENT DOCUMENTS

| | | | |
|---|---|---|---|
| 1,273,043 | 7/1918 | Densmore et al. | 144/240 |
| 2,643,203 | 6/1953 | Drackley | 407/57 |
| 2,723,598 | 11/1955 | Mann | 144/134 C |
| 3,196,749 | 7/1965 | Zanni | 409/180 |
| 3,285,137 | 11/1966 | Hill et al. | 409/182 X |
| 3,289,716 | 12/1966 | Dutot | 144/134 D |
| 3,442,309 | 5/1969 | Jentsch | 409/178 X |
| 3,774,279 | 11/1973 | Hunter | 144/134 D |
| 3,853,160 | 12/1974 | Posey | 144/137 |
| 4,338,052 | 7/1982 | Lockett | 409/206 |
| 4,396,836 | 8/1983 | Vitaliani et al. | 250/223 R |
| 4,601,619 | 7/1986 | Stinnett | 409/180 |
| 4,637,775 | 1/1987 | Kato | 409/138 |
| 4,670,641 | 6/1987 | Porsander et al. | 901/10 |
| 4,784,540 | 11/1988 | Underhaug | 409/138 |

FOREIGN PATENT DOCUMENTS

| | | | |
|---|---|---|---|
| 1121579 | 5/1956 | France | 144/134 C |
| 223512 | 12/1983 | Japan | 409/184 |

OTHER PUBLICATIONS

Thesis paper titled "Feasibility of a Compliant Piloted Deburring System for Precision Robotic Deburring" by Joseph C. Schneider, submitted to Worcester Polytechnic Institute in Apr., 1988.

Primary Examiner—William Briggs
Attorney, Agent, or Firm—Jerome C. Squillaro; Charles L. Moore, Jr.

[57] ABSTRACT

An edge contouring system for removing burrs from edges of precision parts. The system includes an industrial robot for moving a special piloted deburring tool along the part edges. A compliance device applies a constant force on the deburring tool to keep it in contact with the part edge, yet permits movement of the tool in a direction normal to the part surface to accommodate for irregularities in the part geometry. A pilot integral with the deburring tool limits penetration of the tool into the part edge.

14 Claims, 3 Drawing Sheets

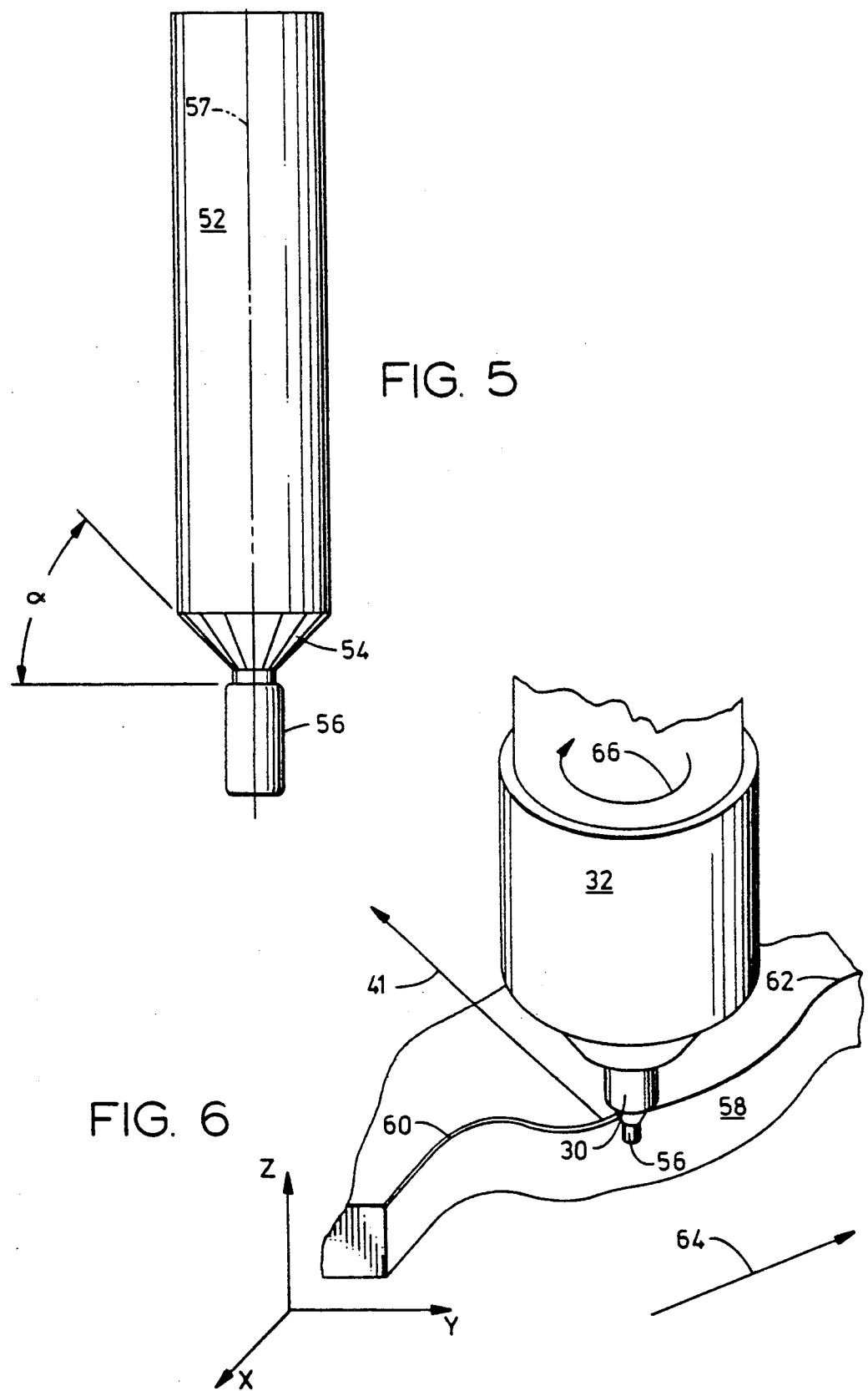

EDGE CONTOURING SYSTEM

The present invention relates generally to edge contouring tools, and more particularly, to a piloted deburring tool used in combination with an industrial manipulator for automatically deburring precision metal parts.

BACKGROUND OF THE INVENTION

Burr formation is an unavoidable consequence of every conventional material removal process. Burrs are fragments of built-up edge left on a workpiece edge during metal cutting. Some ways in which burrs can be formed include plastic deformation of the workpiece, tearing of metal chips from the workpiece, and stock separation in advance of completion of the cutting operation.

The increasing complexity and precision requirements of mechanical products, such as aircraft engines, has created a need for improved methods for controlling the surface texture and finish of manufactured parts. Aircraft engine parts depend upon proper finish of critical surfaces for their successful operation as well as for long trouble-free performance in service. Accordingly, burr removal, or deburring, is an extremely important procedure in the manufacture of jet engine components.

In the past, most deburring was performed manually due to the high degree of dexterity the procedure requires. Manual deburring has proved to be an expensive, labor intensive, monotonous, time consuming job which produces an inconsistent finished surface. More recently, deburring tools have been coupled with industrial robots in an attempt to improve product quality and increase production.

Deburring is a micromachining process which is extremely difficult for a robot to perform due to the high degree of flexibility and dexterity required. Several automated edge contouring or deburring systems have been designed to debur precision machined parts. The simplest systems comprise a grinding tool secured to a robot arm, while more sophisticated systems may include computer controlled robot systems, force sensors and feedback control schemes.

Initially, robotic systems were used for deburring casting and forging flash and for grinding weld beads—procedures characterized by low edge finish specifications. Precision parts, having more stringent edge finish specifications, presented problems in automating burr removal. Control scheme time lags and positional inaccuracy of robotic systems prevented formation of a high quality, burr-free, edge finish.

Closed loop robotic deburring systems provide feedback control schemes and contain sensors for monitoring either the position of the robot's arm or cutting forces during deburring. The sensor signals are continuously compared with the preprogramed position or force instructions for the robot arm, and are used to generate an error signal which is fed back to the controller. The controller adjusts the positioning of the robot arm to reduce the magnitude of the error signal. An unfortunate drawback of a closed loop feedback control scheme is the inability of the robot to respond in real time to the detailed features of a burr. The action of the deburring system in response to the error signal will always suffer a time delay due to the electrical and mechanical response times of the system. The position of the deburring tool will oscillate about the desired position as a result of this delay.

One simple solution to the problem of time delay associated with a closed loop feedback control scheme is the utilization of an open loop control system. In a simple open loop system, the desired tool path is programmed into the robot's controller and is independent of output measurements. A disadvantage of an open loop system is its inability to alter tool path in response to variations in part geometry or to part misalignment.

Other areas of concern with robotic deburring systems include positional accuracy, repeatability, machine rigidity, and tool wear compensation. Positional accuracy is the ability of the robot to position the deburring tool at a point which has been programmed into the machine controller. Repeatability is the ability of the robot to achieve the same tool position over and over again. Accuracy and repeatability are affected by such factors as machine resolution, friction between the moving parts of the robot arm, and time delays inherent in closed loop control schemes. Machine rigidity, or stiffness, refers to the robot's ability to resist bending or twisting in response to the different forces acting upon the apparatus. Tool wear compensation describes the ability of the system to adjust itself for gradual changes in cutting tool geometry due to wear.

OBJECTS OF THE INVENTION

It is a primary object of the present invention to provide a new and improved apparatus for performing high quality edge finishing of precision parts.

It is an additional object of the present invention to provide a comparatively simple automated deburring system which utilizes a piloted deburring tool to precisely machine part edges.

A further object of the present invention is to provide a new and improved system for performing edge finishing of precision parts in which the precision part itself is used as a guide for the edge finishing operation.

SUMMARY OF THE INVENTION

In accordance with the principles of the present invention, there is provided an improved apparatus for removing burrs from part edges, such as from precision components for use in aircraft engines. The improved deburring apparatus includes a rotary cutting tool having an integral pilot. The apparatus further includes means for rotating the cutting tool and means for guiding the cutting tool in a predetermined path along the part edge.

The novel features believed to be characteristic of the present invention are set forth in the claims. The above and other objects of the present invention together with the features and advantages thereof will become apparent from the following detailed specification when read in conjunction with the accompanying drawings in which applicable reference numerals have been carried forward.

BRIEF DESCRIPTION OF THE DRAWINGS

FIG. 5 is a side view of the rotary cutting tool and integral pilot employed in the edge contouring apparatus of FIGS. 1 through 4.

FIG. 6 is an illustration showing operation of the rotary cutting tool against a workpiece edge.

DETAILED DESCRIPTION OF THE INVENTION

Figure 1:
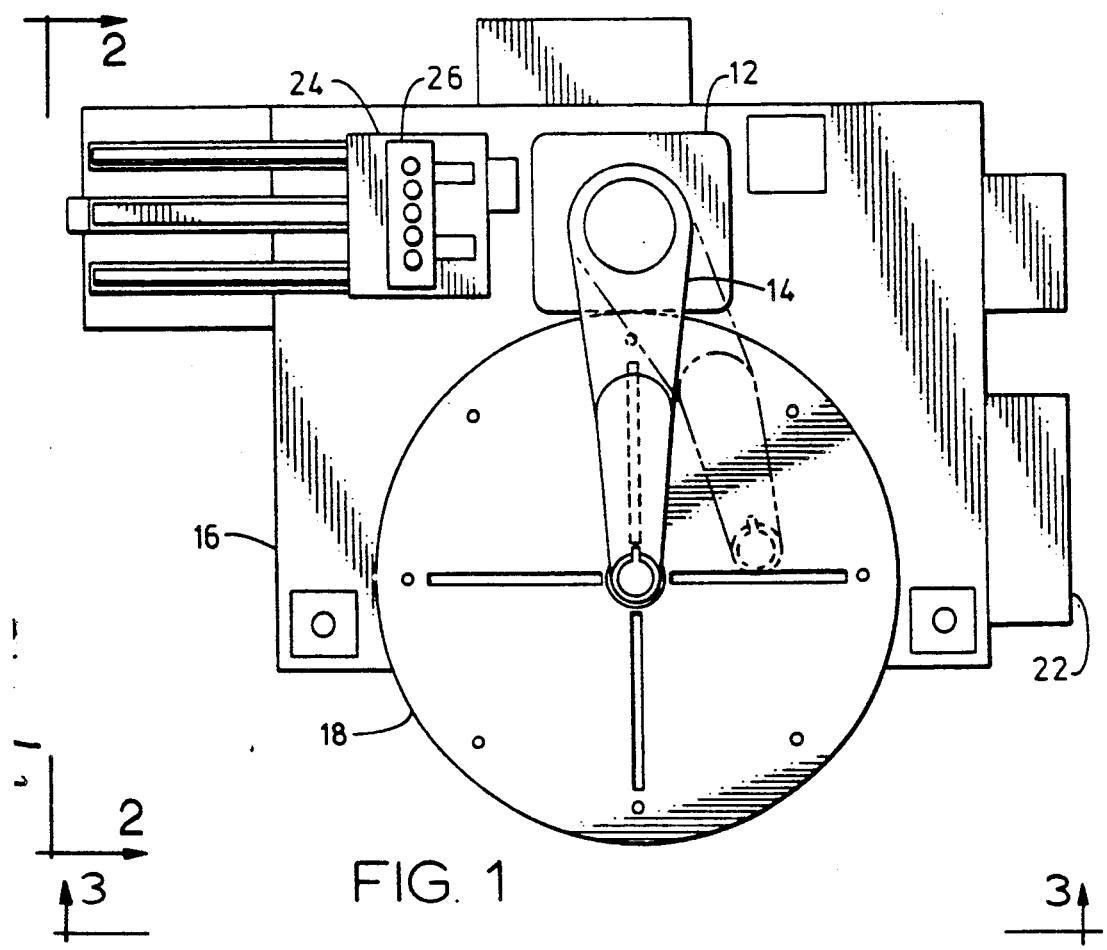
FIG. 1 is a top view of an edge contouring apparatus constructed in accordance with the principles of the present invention.
Figure 2:
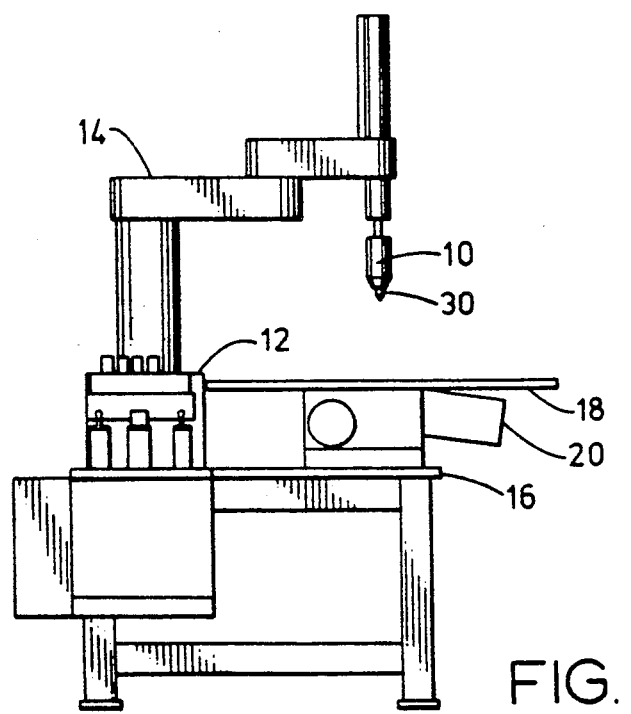
FIG. 2 is a side elevation view of the edge contouring apparatus of FIG. 1, viewing the apparatus in the direction shown by arrows 2.
Figure 3:
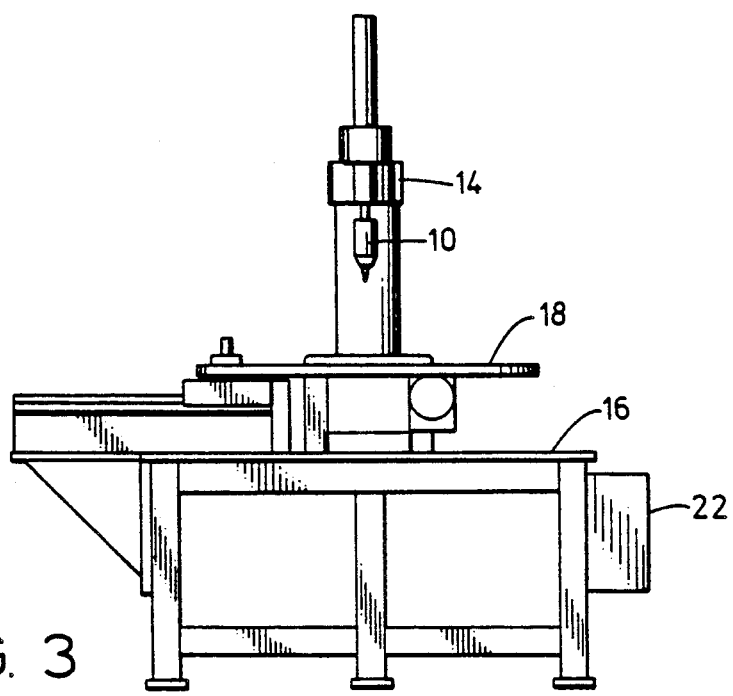
FIG. 3 is a side elevation view of the edge contouring apparatus of FIG. 1, viewing the apparatus in the,, direction shown by arrows 3.

Referring now to the drawings, FIGS. 1 through 3 illustrate an edge contouring system for performing precision robotic deburring of workpiece edge. FIG. 1 is a top view of the edge contouring system, while FIGS. 2 and 3 are side elevations of the system viewed from the directions indicated by arrows 2 and 3, respectively, of FIG. 1.

The edge contouring system includes an industrial manipulator 12, such as an ADEPT ONE robot manufactured by ADEPT Technology, Inc. The ADEPT ONE robot is a Selectively Compliant Arm for Robotic Assembly (SCARA) type robot. Secured to the end of the robot's arm 14 is a tool holder 10 and rotary cutting tool or deburring tool 30, which will be discussed in greater detail below.

The workpiece to be deburred (not shown) is secured to the top surface of a rotary index table 18 rotatable mounted to a work table 16. An index table controller 22 operates a drive mechanism 20 to control the position of index table 18 and the workpiece secured thereto. The index table and associated fixturing are included to permit deburring of large parts which extend beyond the standard useable area of the robot's work envelope. Tool holder 10, rotary cutting tool 30 and robot arm 14 are positioned above work table 16 and index table 18. A multiple tool holding system 26, moveable along a track 24 provides for extended unmanned operation capability and safe unloading and loading of additional rotary cutting tools out of the robot's work envelope.

Figure 4:
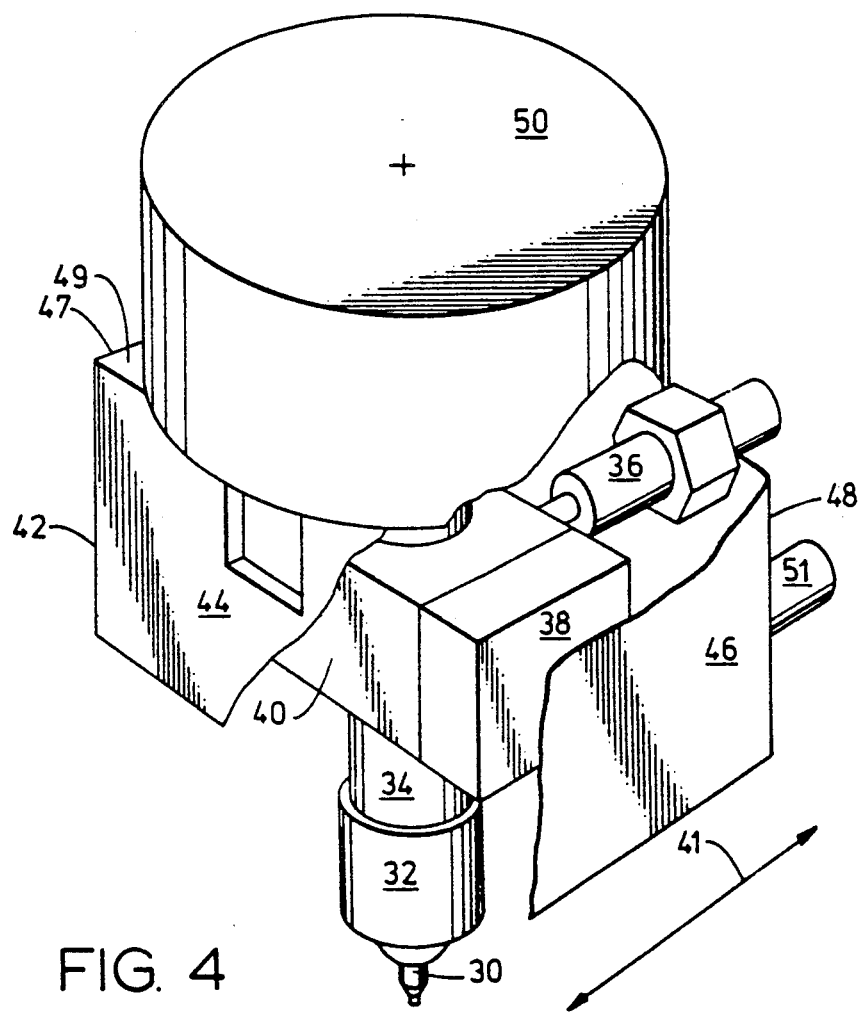
FIG. 4 is a perspective view, partly cut away, of the tool holder assembly shown in FIGS. 1 through 3.

Tool holder 10 is shown in greater detail in FIG. 4. The tool holder includes a housing 42 consisting of a front plate 44, side plates 46 and 47, a back plate 48 opposite front plate 44, and a top plate 49. The upper portion of an air grinder 34 is secured within a yoke 40 within housing 42. The lower portion of grinder 34 extends below the housing and yoke. Deburring tool 30 is held in a chuck 32 attached to, and rotated by, grinder 34.

Linear bearings 38 are positioned between yoke 40 and side plates 46 and 47 to permit translation of the yoke and grinder between the front and back plate of the housing. Arrow 41 shows the direction of travel in which yoke 40 and grinder 34 are constrained by housing 42 and bearings 38. Placed between yoke 40 and back plate 48 is a compliance device 36. The compliance device is a shock absorber device which functions to dampen motion of the grinder and yoke in the direction shown by arrow 41. Alternatively, the compliance device may be simply a spring and damper system.

Deburring tool 30, also known as a rotary grinder or bur, is shown in side view in FIG. 5. The deburring tool includes a shaft 52, a plurality of flutes or cutting teeth 54, and an integral guidance pilot 56. The deburring tool is symmetric about an axis of rotation 57. Pilot 56 is actually a shaft coaxial with shaft 52 but of smaller diameter which extends below shaft 52 and flutes 54. Flutes 54 extend from the end of shaft 52 to the base of pilot 56 at an angle $\alpha$ relative to the normal of axis 57. Shaft 52 is secured in chuck 32 during operation of the edge contouring system. Pilot 56 is ground into the deburring tool during manufacture to assure superior strength, long tool life, and economy of manufacture. Alternatively, the pilot can be fashioned as an insert to shaft 52 if sufficient strength and concentricity are provided.

A piloted deburring tool having the following dimensions has been constructed:

diameter of shaft = 0.2498 in.
diameter of pilot = 0.094 in.
length of shaft = 0.960 in.
length of pilot = 0.212 in.
total length of tool = 1.250 in.
number of flutes = 16
angle $\alpha = 45°$
construction material = tungsten carbide.

Although the above tool was constructed of tungsten carbide, the tool may be fabricated from other suitable materials. High carbon steel and ceramic are examples of two such materials. Abrasives may also be employed in place of cutting teeth or flutes 54 to remove material from the part undergoing deburring.

Operation of the edge contouring system will now be explained with reference to FIG. 6. The workpiece or part to be deburred is fixtured manually to the top of index table 18. Industrial robot 12 (shown in FIGS. 1 through 3) is programmed to move deburring tool 30 along the perimeter of part 58 such that the axis of compliance 41 is at a right angle to the part edge at all times. Compliance device 36 (shown in FIG. 4), which is preloaded with a force of one pound, exerts pressure on the yoke and grinder to keep deburring tool 30 and pilot 56 in contact with part 58. Deburring or chamfering of the part edge is accomplished by rotating deburring tool 30 at high RPM in the direction of arrow 66 while the industrial robot moves the tool assembly along the part edge. Material is removed from the top edge to form a chamfer 60 by the action of the cutting teeth on the tungsten carbide deburring tool or abrasive on a ceramic tool. Movement of the tool assembly is in the direction of arrow 64 at the instant illustrated in FIG. 6.

Pilot 56 enables the deburring tool to maintain an extremely accurate chamfer by limiting the tool's horizontal penetration into the part edge. Vertical penetration is controlled by manipulator 12 (FIG 1). The width of the chamfer is determined by the position of tool 30 along the Z axis. Positioning the deburring tool lower along the z axis would produce a wider chamfer, while raising the tool would cut a narrower chamfer along the part edge.

In addition to exerting pressure on the yoke and tool assembly to keep deburring tool 30 and pilot 56 in contact with the part edge, the compliance device 36 (FIG. 4) also acts as a damping device to decelerate forces acting upon the deburring tool. These forces result from contact between tool 30 and burrs along the part edge and from other variations in part geometry. The force generated by compliance device 36 can be determined from the following equation:

$$F = F_0 + kx + C\dot{x}$$

where
- k = spring constant (lbs/in),
- C = damping coefficient (lbs/in-sec),
- x = displacement along the axis of compliance,
- $\dot{x}$ = rate of change, and
- $F_O$ = preload force.

An important feature of the compliance device utilized in the edge contouring system described above is that the damping action of the device is single acting, i.e., if $\dot{x}$ is negative, then the term $C\dot{x}$ in the above equation is equal to zero.

The edge contouring system as shown in FIGS. 1 through 3 also includes an automated tool changing system. Chuck 32 is specially designed to operate automatically to grasp and release deburring tools stored in a moveable tool rack 26. Deburring tools are locked into the chuck by centrifugal force during operation of the grinder. The tool rack is attached to a slide mechanism 24 for removing the tool holder from the reach of the robot arm so that an operator can replace worn tools without interfering with the deburring operation.

A force sensor 50 and a linear variable displacement transducer (LVDT) position sensor 51 (shown in FIG. 4) are included to provide force and position feedback guidance to avoid part damage from overload or underload. Sensors 50 and 51 are also used prior to deburring to verify correct positioning of the workpiece, set the height of tooling, and to assure the top of the workpiece is located in the proper plane. To verify positioning and set tooling height, tool holder 10 (FIGS. 2, 3 and 4) is utilized as a probe. With the deburring tool lowered and positioned away from the center of the index table, the tool holder is moved radially until contact with the workpiece is made and a signal sent from the LVDT position sensor to machine controller 22. The outside profile of the part is thereafter traced to ensure the workpiece is fixtured properly.

To locate the top surface of the part and set the tooling height, the tool holder is first raised and positioned over the workpiece. The tool holder is then lowered until contact between the deburring tool and the top surface of the workpiece occurs, causing force sensor 50 to transmit an electric signal to the machine controller. By performing this function at several points about the top surface of the workpiece the proper planar placement of the workpiece can be verified.

From the foregoing specification it will be clear to those skilled in the art that the present invention is not limited to the specific embodiment described and illustrated and that numerous modifications and changes are possible without departing from the scope of the present invention. For example, the robotic edge contouring system described above produces an extremely accurate chamfer (±0.002 in.) about the perimeter of precision aircraft engine parts, however, the system can be used to debur or edge finish simple or complex parts for various end uses. Also, the grinder need not be air operated. Additional sensors and probes can be added to the system to measure or inspect key features on the parts being machined. The piloted tool may also be utilized with a simple hand held deburring motor to perform edge finishing. This, though not as controllable as a robotic system, would facilitate tracing difficult shapes while cutting metal with a hand held tool.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for machining an edge of a workpiece, comprising:
   - a rotary cutting tool;
   - means for rotating said rotary cutting tool;
   - means for moving said rotary cutting tool along the edge of the workpiece;
   - a pilot, connected to said rotary cutting tool, for limiting the penetration of said rotary cutting tool into the edge of said workpiece;
   - means for permitting movement of the rotary cutting tool in a direction normal to the workpiece edge; and
   - compliance means for applying a force on said rotary cutting tool to drive said cutting tool into the workpiece edge, said force being applied in said normal direction.

2. The apparatus according to claim 1, further comprising means for damping the movement of said rotary cutting tool caused by said cutting tool striking a burr on the edge of the workpiece.

3. The apparatus according to claim 1, wherein said means for applying a force on said rotary cutting tool comprises a spring and damper assembly.

4. The apparatus according to claim 1, wherein said means for applying a force on said rotary cutting tool comprises a shock absorber.

5. The apparatus according to claim 1, wherein said means for rotating said rotary cutting tool comprises an air grinder.

6. The apparatus according to claim 1, wherein said means for moving said rotary cutting tool comprises an industrial manipulator.

7. The apparatus according to claim 6, wherein said industrial manipulator comprises a computer controlled robotic arm.

8. The apparatus according to claim 1, wherein said pilot is integral with said rotary cutting tool.

9. The apparatus according to claim 8, wherein said rotary cutting tool and integral pilot comprise:
   - a first cylindrical shaft;
   - a second cylindrical shaft of lesser diameter than and coaxial with said first shaft, said pilot consisting of said second shaft; and
   - a tapered section between said first shaft and said second shaft.

10. The apparatus according to claim 9, further comprising a plurality of cutting teeth formed on the surface of the tapered section of said rotary cutting tool.

11. The apparatus according to claim 9, further including an abrasive coating applied to the surface of the tapered section of said rotary cutting tool.

12. Apparatus for removing burrs and producing an accurate chamfer on the edge of a workpiece, comprising:
   - a grinding motor;
   - a rotary cutting tool;
   - means for securing said cutting tool to said grinding motor, whereby said cutting tool is rotatable by said grinding motor;
   - a robot for supporting said grinding motor and moving said rotary cutting tool in a predetermined path along the edge of said workpiece;
   - means for permitting movement of the rotary cutting tool in a direction normal to said workpiece edge;

a compliance means for applying a force on said rotary cutting tool in said normal direction to drive said cutting tool into contact with said workpiece edge; and a guidance pilot integral with said rotary cutting tool for limiting the penetration of said cutting tool into the edge of said workpiece.

13. The apparatus according to claim 12, wherein said rotary cutting tool and integral pilot comprise:

a first cylindrical shaft;

a second cylindrical shaft of lesser diameter than and coaxial with said first shaft, said pilot consisting of said second shaft;

a tapered section between said first shaft and said second shaft; and a plurality of cutting teeth formed on the surface of the tapered section of said rotary cutting tool.

14. The apparatus according to claim 12, wherein said compliance device comprises a spring and damper, said spring being preloaded to generate said force on said rotary cutting tool.

* * * * *